BEST AVAILABLE COPY

E. A. G. ROULSTONE.

TRUNKS.

No. 7,130. Reissued May 23, 1876.

WITNESSES

Franck L. Durand
Henry N. Miller

INVENTOR

E. A. G. Roulstone

By Alexander Mason
Attorneys

N. PETERS, PHOTO-LITHOGRAPHER, WASHINGTON, D. C.

UNITED STATES PATENT OFFICE.

EDWARD A. G. ROULSTONE, OF BOSTON, MASSACHUSETTS, ASSIGNOR TO GEORGE M. BALLARD AND GEORGE MINCHIN.

IMPROVEMENT IN TRUNKS.

Specification forming part of Letters Patent No. 59,272, dated October 30, 1866; reissue No. 7,130, dated May 23, 1876; application filed April 24, 1876.

*To all whom it may concern:*

Be it known that I, EDWARD A. G. ROULSTONE, of Boston, in the county of Suffolk and State of Massachusetts, have invented certain new and useful Improvements in Traveling-Trunks; and I do hereby declare that the following is a full, clear, and exact description thereof, reference being had to the accompanying drawings, and to the letters of reference marked thereon, which form a part of this specification.

The nature of my invention consists in the construction and arrangement of certain trunk-irons, as will be hereinafter more fully set forth.

In order to enable others skilled in the art to which my invention appertains to make and use the same, I will now proceed to describe its construction and operation, referring to the annexed drawing, in which—

Figure 1:
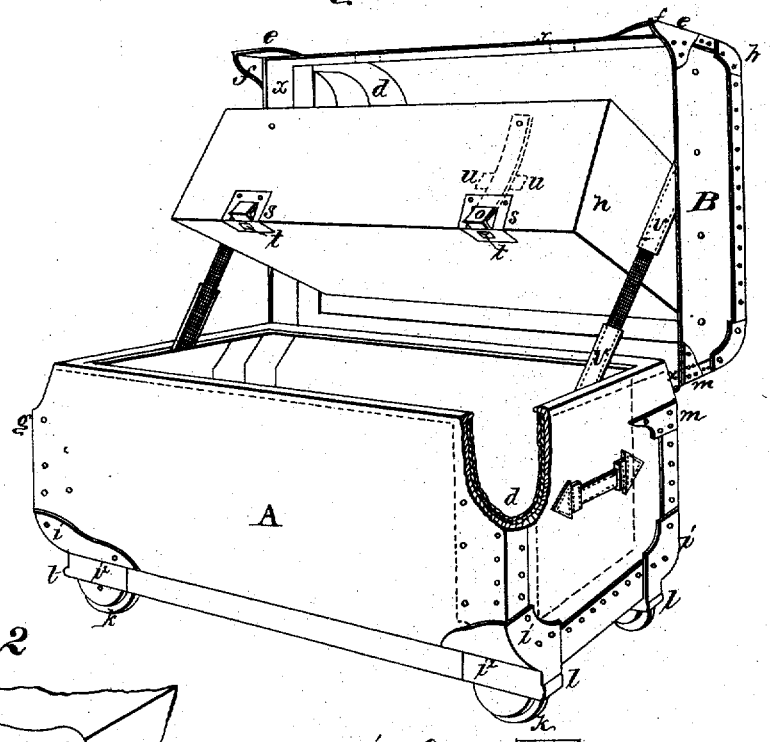
Figure 2:
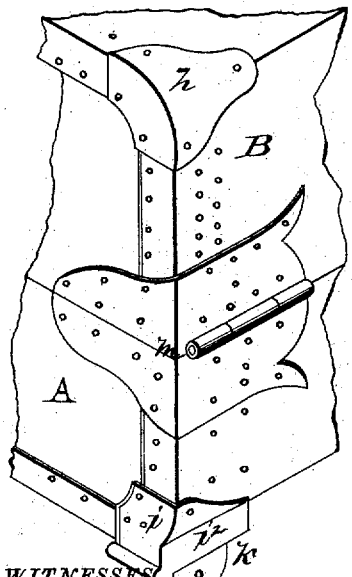
Figure 3:
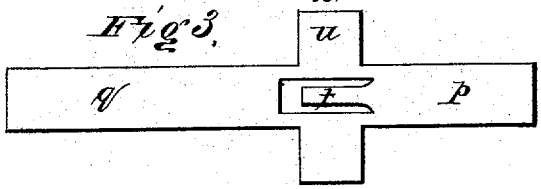
Figure 4:
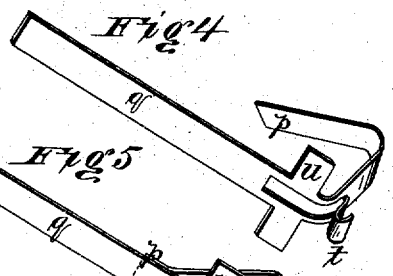

Figure 1 is a perspective view of a trunk embodying my invention. Fig. 2 is a view of the rear corner of the trunk. Figs. 3, 4, and are detached views of some of the irons used in the trunk.

A represents the body of a trunk, and B is the lid thereof. The end of each part A and is formed or riveted upon an angle-metal frame, *d*, but right-angularly in a transverse direction, and shaped longitudinally to the form. Said part is to have in cross-section the leather forming the sides and bottom, (or top,) being lapped over upon the end-pieces, vice versa, and riveted directly to the metal frame, which is placed inside of the other body. By this construction I dispense with the stitches usually employed in making the body, and, if advisable, with the iron bands upon the exterior of the trunk, imparting great strength to the body by these frames.

At each front corner of the lid B, where it fits over the body A, I apply a guard, *e*, fit around the front and end, and riveted through the leather to a metal band or frame, riveted to the lid, and forming the closing-thereof, the guard having an extension, projecting down below the edge of the lid, and so as to fit close against the corners *g*. this extension of the guides the parts A and B, and the hinges connecting them, are preserved from injury by violent lateral strain upon either part of the trunk.

Each upper corner of the trunk is protected by a guard, *h*, swaged or otherwise so made into form as to project over the end, top, (or bottom,) and adjacent side of the body, and riveted to the frame *d*. Each lower corner-guard *i* is formed and applied to the body and angle-frame *d* in the same manner as is the guard *h*, and has, forming part of or made integral with it, a projection, $i^2$, resting directly against the bottom of the trunk, and forming a bearing for a caster, *k*. The angle of this corner iron or guard *i* is formed with a shoulder or projection, *l*, which not only protects the caster, but also serves as bumper to protect the trunk from injury in handling, and when violently striking the ground. Each hinge *m* is formed of two parts, each of which is bent around the back and end of the body, as seen in Fig. 2, and is riveted through the back and end to the band *x*, the upper half of each hinge extending down flush with the edge of the lid, the hinge so constructed and applied being very strong, and, in connection with the guards *e*, making an invulnerable protection to the trunk at the line of opening thereof.

Figure 5:
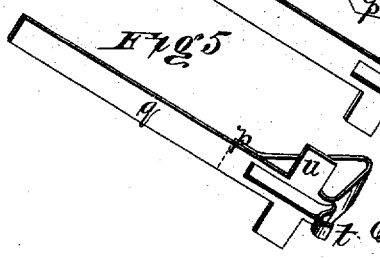

The swinging box *n*, which occupies the lid of the trunk, is held in place by spring-latches *o* of peculiar construction. Each latch is formed of a single piece of metal, first cut into a flat form, as seen in Fig. 3, and then bent into the shape as seen in Fig. 4, and subsequently having the end *p* soldered or fastened to the shank *q* of the plate, as shown in Fig. 5. The shank *q* is riveted to the inside of the box *n*, as shown by dotted lines in Fig. 1, and the bent part *o* forms a latch projecting through a plate, *s*, and latching behind a catch in the lid, the portion *t* forming a thumb-piece to spring back the latch. Ears *u* at the opposite sides of the shank *q* prevent the latch from protruding too far from the face of the box.

The webbing-straps, which are generally applied to prevent the lid of a trunk from tipping back, are objectionable in that they generally swing out from the trunk in closing it.

To obviate this they are sometimes connected by an elastic cord running from one to the other; but the employment of such elastic is objectionable, because it does not permit convenient access to the box in the lid. To obviate these objections I apply to each webbing springs *v*, which, as the lid is closed, spring inward, carrying with them the webbing, and preventing it from protruding beyond the trunk.

Having thus fully described my invention, what I claim as new, and desire to secure by Letters Patent, is—

1. The angle-frames *d*, constructed substantially as described, and adapted to be applied to the interior of the body of a trunk, and with the side of the body lapped over the end, or vice versa, and riveted to the angle-frame, substantially as described.

2. The guard *e*, provided with extension *f*, and adapted to be secured to the frame or body *x*, substantially as set forth.

3. The metal guard *h*, constructed as described, and adapted to be secured to the angle-frame or body *d*, substantially as set forth.

4. The guard or angle iron *i*, provided with a shoulder or projection, *l*, at the angle or corner of the iron, for the purposes herein set forth.

5. The projections $i^2$ and shoulders *l*, formed on the guards *i*, for the purposes herein set forth.

6. The spring-latches *o*, constructed and adapted to be applied substantially as herein set forth.

7. The springs *v*, in combination with the webbing, as and for the purposes herein set forth.

In testimony that I claim the foregoing I have hereunto set my hand and seal this 12th day of April, 1876.

E. A. G. ROULSTONE. [L. S.]

Witnesses:

P. E. TESCHEMACHER,

W. J. CAMBRIDGE.